June 23, 1964     H. L. PARISER ETAL     3,138,024
LIQUID LEVEL-RESPONSIVE INDICATING AND CONTROL APPARATUS
Filed Nov. 23, 1962
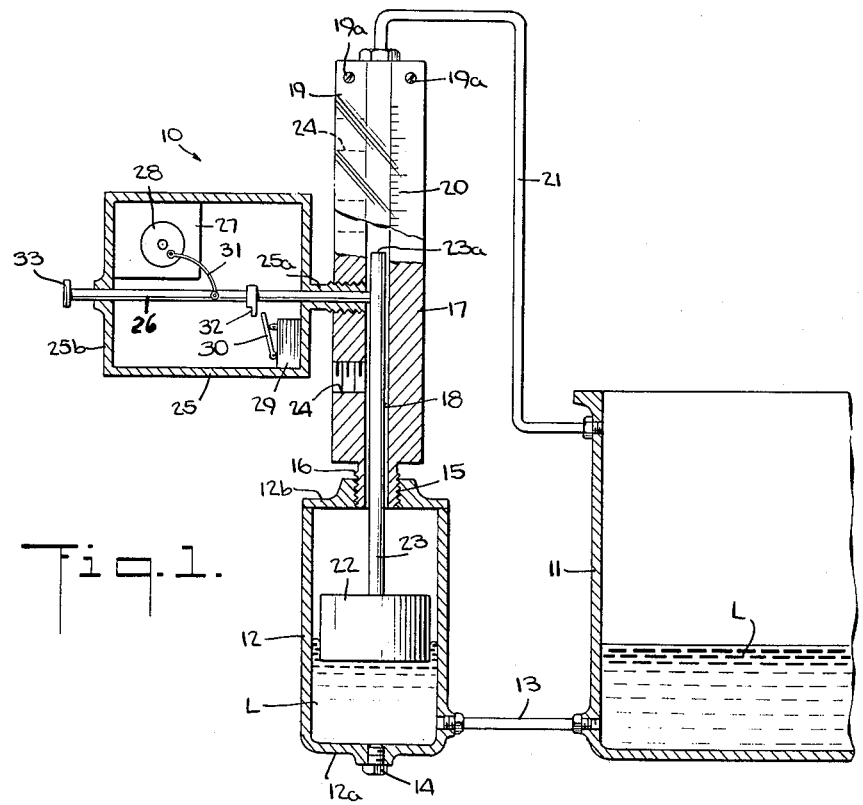
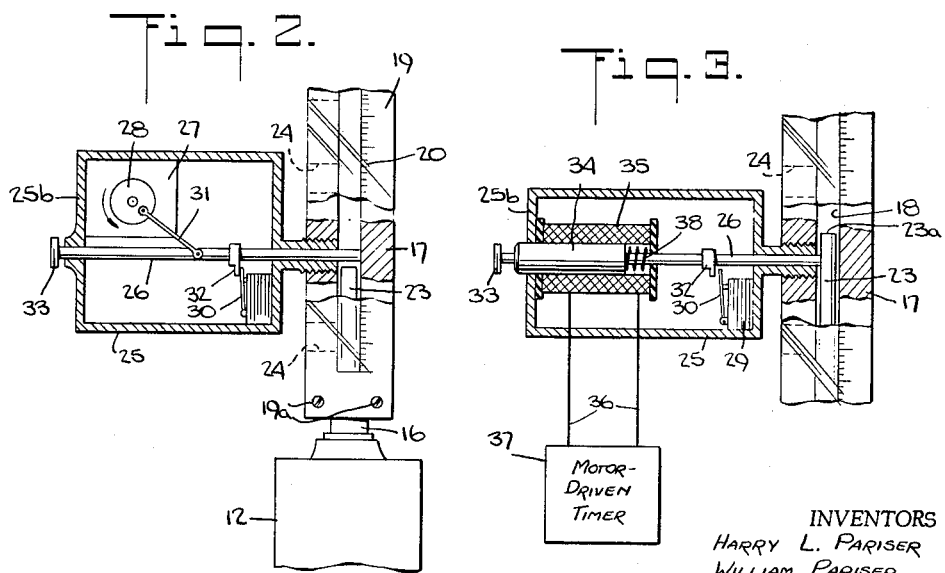
INVENTORS
HARRY L. PARISER
WILLIAM PARISER
BY *Norbert P. Holler*
ATTORNEY

United States Patent Office 3,138,024
Patented June 23, 1964

3,138,024
LIQUID LEVEL-RESPONSIVE INDICATING
AND CONTROL APPARATUS
Harry L. Pariser, Osborn Road, Harrison, N.Y., and
William Pariser, 100 Secor Road, Scarsdale, N.Y.
Filed Nov. 23, 1962, Ser. No. 239,474
14 Claims. (Cl. 73—308)

This invention relates to liquid level-responsive indicating and control apparatus.

It is an object of the present invention to provide liquid level-responsive indicating and control means in which a level-indicating member is sensed intermittently by a probe or like sensing member so as to permit a control function to be initiated only when the indicating member attains a predetermined relationship to the sensing member.

A related object of the present invention is the provision of such liquid level-responsive indicating and control means in which the sensing member is arranged for oscillatory movement toward and away from the indicating member.

A more specific object of the present invention is the provision of such liquid level-responsive indicating and control means in which the indicating member moves in a path crossing the path of oscillatory movement of the sensing member in such a manner that the control function is initiated when the forward stroke of the sensing member ends without the latter having made contact with a part of the indicating member.

Another object of the present invention is the provision of indicating and control means as aforesaid which are of greatly simplified construction, may be manufactured as units at relatively little cost and can be easily connected at any desired elevation to existing liquid-containing vessels associated with mechanisms the operation of which is to be controlled.

Although the invention is of broad and general utility, being adapted for combination with a variety of systems the proper operation of which requires and depends on the existence or maintenance of a predetermined level of an associated body or quantity of liquid, it will be described herein as applied to the control of an engine or motor equipped with a crankcase containing a quantity of oil or like lubricating liquid for the said engine or motor.

In this context, the implementation of the basic principles of the invention entails the provision of a float chamber communicating with the bottom region of the crankcase. A float in this chamber rides on the liquid therein which is at the same level as the liquid in the crankcase. An indicator rod extends up from the float along a scale for direct reading of the liquid level. The path of movement of the rod crosses the path of oscillatory movement of a sensing rod or probe which repeatedly and intermittently engages the indicator rod during each forward stroke as long as the level of the liquid is above a predetermined minimum. Should this condition not obtain, the float-supported indicator rod sinks and the probe does not make contact therewith during its forward stroke, whereby its movement continues until a projection or arm on the probe actuates a switch controlling the engine or motor and causes the operation of the same to be interrupted.

The oscillation of the probe is preferably effected electromechanically. In accordance with one aspect of the present invention, a motor-driven eccentric is connected to the probe by a flexible shaft, while in accordance with another aspect of the invention the probe is connected to the armature of a solenoid which is periodically energized with the aid of a suitable timer driven by an electric motor. In either case, the probe and its motive means are preferably arranged in a housing adapted to be secured essentially horizontally to a vertical hollow body through which the indicator rod moves, with the said body being laterally apertured at a plurality of vertically spaced locations to permit connection of the housing to the body at different elevations.

The foregoing and other objects and characteristics of the present invention, as well as the advantages accruing therefrom, will be more clearly understood from the following detailed description thereof when read in conjunction with the accompanying drawing, in which:

FIG. 1 is a partly sectional and somewhat schematic elevational view of a liquid level-responsive indicating and control unit according to one embodiment of the present invention as used in conjunction with the crankcase of an engine;

FIG. 2 is a fragmentary, partly sectional view of the structure shown in FIG. 1 and illustrates the condition thereof in the absence of a sufficient amount of liquid in the crankcase; and FIG. 3 is a fragmentary, partly sectional view of a slightly modified embodiment of the liquid level-responsive indicating and control unit according to the present invention.

Referring first to FIG. 1, the indicating and control unit 10 according to the present invention is shown as associated with the crankcase 11 of any suitable motor or engine (not shown), for example a compressor or an internal combustion engine. The crankcase contains a quantity of lubricating oil or similar liquid L. The unit 10 comprises a relatively small hollow member 12 the bottom region of which is in communication with the bottom region of the crankcase 11 by means of a pipe 13. Thus, a quantity of the lubricating oil L is always present in the chamber defined within the member 12, and the quantities of the liquid in the respective vessels 11 and 12 are at the same level. The bottom end wall 12a of the member 12 is provided with a drain opening normally closed by a plug 14, while the preferably removable top end wall 12b of the member 12 is provided with an internally threaded opening 15. The member 12 may be physically supported in any suitable manner (not shown), e.g. by means of a bracket bolted to the crankcase or to some other nearby mounting structure.

Screwed into the opening 15 is an externally threaded nipple 16 of a vertically extending, elongated body 17 which is preferably of rectangular cross-section. The body 17 is provided with an axial bore 18 and is initially open at one side. This side, which will hereinafter be referred to as the front, is covered by a transparent plate 19 which is secured to the body by screws 19a and provided with a scale 20 disposed along the bore 18 and calibrated in units of level of the liquid L in the crankcase 11. The top end of the bore 18 preferably is in communication with the top region of the crankcase via a pipe 21 for the purpose of ensuring that equal pressures exist in the crankcase 11 and the chamber 12.

Located in the chamber 12 is a float 22 which rides on the quantity of liquid L therein. The float is provided with a vertical rod 23 which extends upwardly into the bore 18 of the body 17 and is visible through the plate 19. Thus, the uppermost end or tip 23a of the rod 23 provides an indication of the level of the liquid L in the chamber 12 and, consequently, of the level of the liquid in the crankcase 11.

At one side, the gauge body 17 is provided with a plurality of vertically spaced, internally threaded, substantially horizontal bores 24 which communicate at their innermost ends with the longitudinal bore 18. Into a selected one of the bores 24 is screwed an externally threaded bushing 25a of a housing 25. The latter is provided with a pair of axially aligned bores in the bushing 25a and in the housing rear wall 25b, respectively, in which is slidably arranged an elongated rod 26. Also arranged in the housing 25 are an electric motor 27 which drives an eccentric 28, and a control switch 29 which is electrically connected, in a manner not shown, to both the motor 27 and the source of power for the motor or engine associated with the crankcase 11. The switch 29 has an actuating arm 30 one end of which is disposed adjacent the rod 26. The eccentric 28 is drivingly connected to the rod 26 by means of a flexible shaft or like transmission member 31. The rod 26 further carries an actuating arm or lever 32 at a point intermediate the location of the switch arm 30 and the connection between the rod 26 and the shaft 31. Those of the bores 24 which are not in use are preferably closed by suitable threaded plugs (not shown).

In operation, as long as the level of the liquid L in the crankcase 11 is sufficiently high to permit continued operation of the associated motor or engine with adequate lubrication, the position of the float 22 in the chamber 12 is such that the indicator rod 23 extends upwardly beyond the bore 24 at which the housing 25 is supported. With the eccentric 28 being rotated by the motor 27, the rod 26 is oscillated back and forth through the housing 25. At a certain point during each forward stroke of the rod 26, therefore, the latter acting as a probe makes contact with a part of the indicator rod 23 which, consequently, prevents completion of the forward stroke. The arm 32 is so located on the probe 26 that it cannot engage and displace the switch arm 30 when the probe makes contact with the indicator rod 23.

Should the level of the liquid L in the crankcase 11 drop to a dangerously low point, however, i.e. below a predetermined minimum, this condition will be mirrored by the level of the liquid in the chamber 12. The float 22 will then be in a position in which the top end 23a of the indicator rod 23 is located below the path of movement of the probe 26 (see FIG. 2). Since the latter is continuously being oscillated back and forth, as soon as the indicator rod reaches this position, the probe is able to prolong its forward stroke across the bore 18 in the gauge body 17, which displaces the arm 32 sufficiently to engage and move the switch arm 30 so as to actuate the control switch 29, i.e. either to open or close the latter depending on the specific control circuitry employed. The switch thus is made operative to stop the motor or engine associated with the crankcase and also the motor 27 in the housing 25.

This, of course, not only calls the attention of the operator to the existence of the dangerously low level of lubricant in the crankcase, but also prevents the running of the said motor or engine for an extended period without sufficient lubrication until the supply of lubricant in the crankcase has been replenished. When this has been done, the probe 26 is manually retracted from its advanced position by means of a reset knob 33 disposed exteriorly of the housing 25, which returns the switch 29 to its condition in which continuous operation of the motor 27 and the motor or engine associated with the crankcase 11 is again permitted.

It will be understood that if the reset knob 33 were to be pulled out without any prior replenishment of the supply of liquid in the crankcase 11, the control switch 29 would be released and the motor or engine would start up again. Concurrently, however, the motor 27 would also be set into operation, and on the very next forward stroke the probe 26 will again move far enough to actuate the switch 29 so as to stop the entire system once more. It will further be apparent that the presence of the transparent front plate 19 on the gauge body 17 facilitates visual inspection of the indicator rod 23 and the point thereon with which the probe makes contact. Thus, the operator or attendant may determine that more liquid should be added to the supply thereof in the crankcase without waiting for an interruption in the operation of the associated motor or engine.

By virtue of the provision of a plurality of vertically aligned mounting bores 24 in the body 19, the latter is an adapter which enables the indicating and control unit 10 to be associated with liquid containers 11 of a variety of sizes and also to be connected to such containers at any suitable and desired elevation. This is especially advantageous where a part of the exterior of the container is relatively inaccessible. The only condition to be observed is that the housing 25 must be screwed into that one of the bores 24 which just clears the uppermost tip 23a of the indicator rod 23 when the latter is at the highest position that indicates the level of the liquid L to be dangerously low.

In accordance with another aspect of the present invention, the probe 26 extends through and is fixed to the movable armature 34 of a solenoid 35 rigidly secured to the end wall 25b of the housing 25. The solenoid coil is connected by suitable conductors 36 to an electric motor-driven timer 37. A small compression spring 38 operatively connected between the core 34 of the solenoid and the frame of the latter normally urges the probe toward its retracted position, i.e. away from the path of movement of the indicator rod 23.

In operation, whenever the solenoid is energized by the timer 37, the core 34 is drawn in and the probe advanced toward the bore 18. As long as the level of the liquid in the crankcase is safe, the probe will engage the rod 23 and the switch 29 is not actuated. Upon subsequent deenergization of the solenoid, the probe is retracted by the spring 38. Thus, the oscillation of the probe is produced by the repeated energization and deenergization of the solenoid 35. In the event that the level of the liquid L sinks below the predetermined point in the crankcase 11, the indicator rod will also be lowered, permitting the probe 26 to continue its forward stroke until the arm 32 engages the switch arm 30 so as to actuate the switch to stop both the timer motor and the engine or motor associated with the crankcase. The probe may be reset and the system started up again by means of the knob 33 as previously explained in connection with FIGS. 1 and 2. Preferably, of course, even though it is not so shown, the timer 37 and its drive motor will be located in the housing 25 together with the switch 29 and the solenoid 34–35.

In the constructions according to either of the above described embodiments of the present invention, the electrical connections to the housing 25 are deemed to be a matter well within the ken of any skilled electrician and thus have not been illustrated herein.

The liquid level-responsive indicating and control apparatus employing a continuously oscillated probe for sensing a float-supported indicator rod according to the present invention is possessed of a number of advantages in addition to those previously mentioned herein. It is simple and inexpensive to manufacture and install. It also is both compact and rugged and capable of withstanding the rigors of continued use and adverse atmospheric environmental conditions over prolonged periods of time. Moreover, its operation is independent of the existence of any given operating condition of the motor or engine being controlled other than an insufficient supply of the liquid.

It is to be understood that the disclosure herein of preferred embodiments of the liquid level-responsive indicating and control apparatus according to the present invention is for purposes of illustration only, and that a number of changes may be made in the structural features and relationships set forth without any departure from the spirit and scope of the present invention as defined in the appended claims.

Having thus described our invention, what we claim and desire to secure by Letters Patent is:

1. A liquid level-responsive indicating and control apparatus, comprising float means adapted to ride on a body of liquid, an indicator rod carried by said float means, probe means mounted for oscillatory reciprocal movement laterally of said indicator rod, electromechanical means operatively connected with said probe means for moving the same toward and away from the path of movement of said indicator rod, said probe means being positioned so as to make contact with said indicator rod during each forward stroke as long as the level of the liquid is above a predetermined minimum, and control switch means positioned to be actuated by an adjunct of said probe means whenever the forward stroke of the latter is permitted to continue across said path of movement of said indicator rod without any contact between said probe means and said indicator rod in response to the level of the liquid being below said predetermined minimum.

2. Apparatus according to claim 1, said electromechanical means comprising an electric motor, an eccentric rotated by said motor, and a flexible shaft interconnecting said eccentric and said probe means.

3. Apparatus according to claim 2, said control switch means being electrically connected to said motor, whereby the operation of the latter is interrupted upon actuation of said control switch means by said adjunct of said probe means.

4. Apparatus according to claim 1, said electromechanical means comprising a solenoid having a core and a coil, means mounting one of said core and coil so as to be stationary with respect to the other, said probe means being secured to the other of said core and coil for movement therewith, and an electric timer connected to said coil for repeatedly energizing and deenergizing the same.

5. Apparatus according to claim 4, said control switch means being electrically connected to said timer, whereby the operation of the latter is interrupted upon actuation of said control switch means by said adjunct of said probe means.

6. Apparatus according to claim 1, further comprising means for positioning said probe means at different elevations along said path of movement of said indicator rod.

7. A liquid level-responsive indicating and control apparatus for use with the lubricant-containing crankcase of an engine, comprising a hollow vessel defining a chamber, said vessel being adapted to be placed into communication with the crankcase so as to permit an accumulation of the lubricant in said vessel to the same level as in the crankcase, a gauge body secured to said vessel, said gauge body having an elongated vertical bore extending therethrough and opening at its lowermost end into said chamber, a float disposed in said chamber and carrying an indicator rod extending upwardly into said bore, a housing supported adjacent one side of said gauge body and defining a substantially horizontal passageway opening at one end into said bore, an indicator rod-sensing probe slidably arranged in said passageway, means drivingly connected to said probe for oscillating the same toward and away from said bore, and a control switch for the engine located in said housing and having an actuating switch arm disposed in the path of movement of an adjunct of said probe, the relation between said switch arm and said adjunct of said probe being predetermined to ensure that said switch arm for actuating said control switch is engaged by said adjunct of said probe only whenever the forwardmost end of said probe during a forward stroke thereof fails to make contact with a part of said indicator rod upon the float having sunk to below a desired level in said vessel.

8. A liquid level-responsive indicating and control apparatus for use with the lubricant-containing crankcase of an engine, comprising a hollow vessel defining a chamber and adapted to communicate with the crankcase to permit an accumulation of lubricant in said vessel to the same level as in the crankcase, a gauge body secured to said vessel, said gauge body having an elongated vertical bore extending therethrough and opening at its lowermost end into said chamber, a float disposed in said chamber and carrying an indicator rod extending upwardly into said bore, a housing supported for vertical adjustment adjacent one side of said gauge body and defining a substantially horizontal passageway opening at one end into said bore, an indicator rod-sensing probe slidably arranged in said passageway, electromechanical means drivingly connected to said probe for oscillating the same toward and away from said bore, whereby said probe makes contact with a part of said indicator rod in said bore upon the float being above a predetermined minimum level in said vessel, and a control switch for the engine and said electromechanical means located in said housing and having an actuating switch arm disposed in the path of movement of an adjunct of said probe, said switch arm being positioned relative to said adjunct of said probe being so that said switch arm for actuating said control switch is engaged by said adjunct of said probe only whenever the forwardmost end of said probe during a forward stroke thereof fails to make contact with a part of said indicator rod upon the float having sunk to below said minimum level in said vessel.

9. Apparatus according to claim 8, said gauge body having a transparent front to facilitate visual inspection to the location of the uppermost end of said indicator rod in said bore.

10. Apparatus according to claim 8, said gauge body being provided in said one side thereof with a plurality of vertically spaced openings, and said housing being provided with a bushing adapted to be received in and secured to the selected one of said openings, said bushing defining said passageway for said probe.

11. Apparatus according to claim 8, said electromechanical means comprising an electric motor mounted in said housing, an eccentric rotated by said motor, and flexible transmission means operatively interconnecting said eccentric and said probe.

12. Apparatus according to claim 11, said gauge body being provided in said one side thereof with a plurality of vertically spaced openings, and said housing being provided with a bushing adapted to be received in and secured to the selected one of said openings, said bushing defining said passageway for said probe.

13. Apparatus according to claim 8, said electromechanical means comprising a solenoid mounted in said housing and having a core and a coil, one of said core and coil being stationarily secured relative to the other, means connecting said probe to the other of said core and coil for movement therewith, and an electric timer connected to said coil for periodically and repeatedly energizing and deenergizing the same.

14. Apparatus according to claim 13, said gauge body being provided in said one side thereof with a plurality of vertically spaced openings, and said housing being provided with a bushing adapted to be received in and secured to the selected one of said openings, said bushing defining said passageway for said probe.

No references cited.